United States Patent
Weimer et al.

(10) Patent No.: US 10,286,613 B2
(45) Date of Patent: May 14, 2019

(54) LAYERED CONSTRUCTION OF A FIBROUS BODY

(71) Applicant: AIRBUS DEFENCE AND SPACE GMBH, Taufkirchen (DE)

(72) Inventors: Christian Weimer, Munich (DE); Franz Engel, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 122 days.

(21) Appl. No.: 15/285,218

(22) Filed: Oct. 4, 2016

(65) Prior Publication Data

US 2017/0095982 A1  Apr. 6, 2017

(30) Foreign Application Priority Data

Oct. 5, 2015  (EP) .................................. 15 188 309

(51) Int. Cl.
| | | |
|---|---|---|
| *B29C 64/165* | (2017.01) | |
| *B29B 11/16* | (2006.01) | |
| *B29C 64/00* | (2017.01) | |
| *B29C 70/30* | (2006.01) | |
| *B29C 70/40* | (2006.01) | |
| *B29C 65/02* | (2006.01) | |
| *B29L 31/00* | (2006.01) | |

(52) U.S. Cl.
CPC .............. *B29C 70/30* (2013.01); *B29B 11/16* (2013.01); *B29C 64/00* (2017.08); *B29C 64/165* (2017.08); *B29C 65/02* (2013.01); *B29C 70/305* (2013.01); *B29C 70/40* (2013.01); *B29L 2031/731* (2013.01)

(58) Field of Classification Search
None
See application file for complete search history.

(56) References Cited

U.S. PATENT DOCUMENTS

| | | | |
|---|---|---|---|
| 6,214,279 B1 * | 4/2001 | Yang | B29C 41/52 264/308 |
| 6,934,600 B2 | 8/2005 | Jang et al. | |
| 2002/0053257 A1 * | 5/2002 | Brice | B29C 70/12 75/229 |
| 2002/0145213 A1 * | 10/2002 | Liu | G03G 15/224 264/40.1 |
| 2004/0224173 A1 * | 11/2004 | Boyd | C08J 5/18 428/500 |
| 2014/0361460 A1 | 12/2014 | Mark | |

(Continued)

FOREIGN PATENT DOCUMENTS

| | | |
|---|---|---|
| EP | 2727693 A1 | 5/2014 |
| WO | WO 2005030462 | 4/2005 |
| WO | WO 2015120429 A1 | 8/2015 |

OTHER PUBLICATIONS

European Search Report for EP 15 188 309.7 dated Mar. 23, 2016.

*Primary Examiner* — Mary Lynn F Theisen
(74) *Attorney, Agent, or Firm* — Jenkins, Wilson, Taylor & Hunt, P.A.

(57) ABSTRACT

A method to produce a fibrous body that includes structures crosslinked in a fluid-permeable manner. The method includes constructing the fibrous body in layers by alternately applying a fiber-matrix material to a layer substrate and fusing each applied layer of the fiber-matrix material. The fiber-matrix material contains a matrix material and a plurality of short fibers and/or fiber particles.

14 Claims, 1 Drawing Sheet

(56) References Cited

U.S. PATENT DOCUMENTS

2015/0273736 A1 10/2015 Schneider et al.
2016/0114532 A1* 4/2016 Schirtzinger ........... B29C 70/30
428/411.1

* cited by examiner

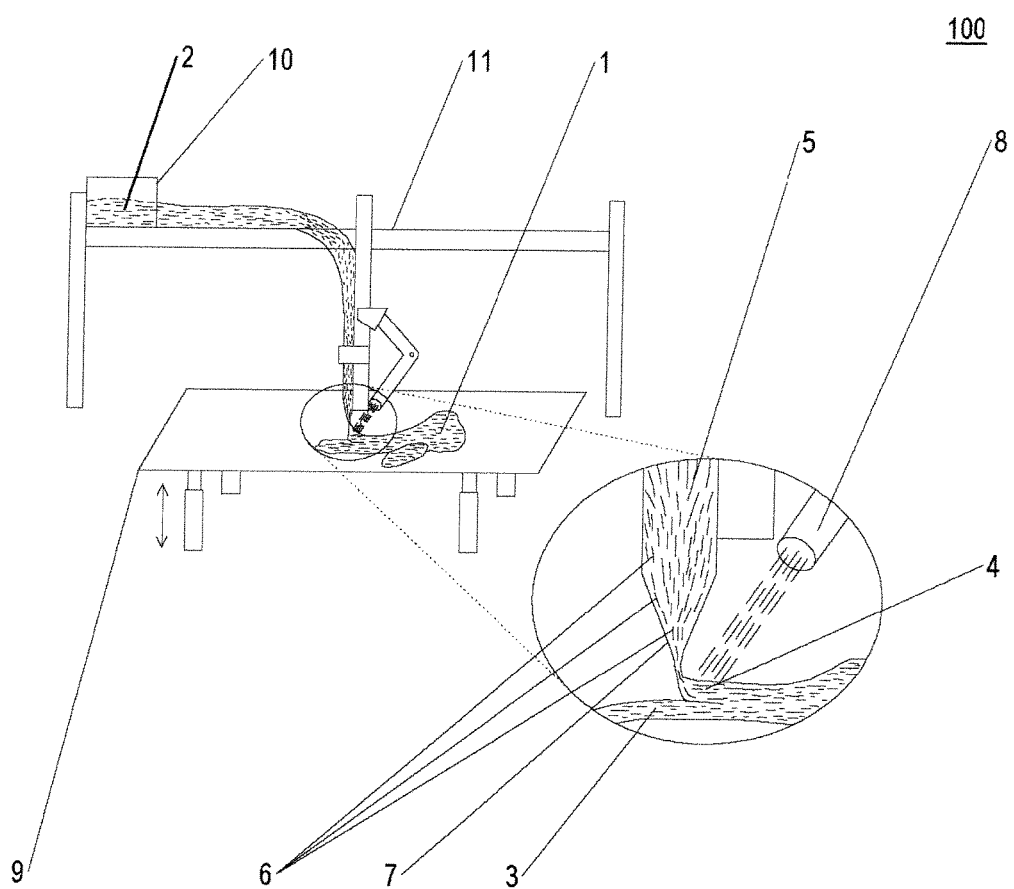

LAYERED CONSTRUCTION OF A FIBROUS BODY

CROSS-REFERENCE TO RELATED APPLICATION

This application claims priority to European Patent Application EP 15 188 309.7 filed Oct. 5, 2015, the entire disclosure of which is incorporated by reference herein.

TECHNICAL FIELD

The present disclosure relates to a method for producing a fibrous body, to a method for producing a fiber-matrix semi-finished product, to a device for producing a fibrous body and to a fibrous body.

BACKGROUND

According to the prior art, the production of fiber-plastics composite components is based on the use of reinforcement semi-finished products produced by textile engineering. For this purpose, fibers first have to be produced and processed to form a textile intermediate product such as a woven fabric, a laid scrim or a nonwoven fabric. A process of this type requires a high amount of effort with regard to both the execution thereof and the required devices.

U.S. Pat. No. 6,934,600 B2 discloses a method for producing fiber-reinforced composite material, in which a liquid mixture of nanotubes is sprayed to form a fiber. A plurality of portions of these fibers are oriented and optionally subjected to a textile operation such as weaving or braiding, before they are melted, pressed and cured to form a preform.

One disadvantage of a procedure of this kind is the complex handling of the fiber portions. In addition, the fiber portions have to be positioned in accordance with a desired shape of a composite material to be produced, unless cutting takes place, which is accompanied by material loss.

US 2014/0361460 A1 discloses a method for generatively manufacturing a component, in which a fiber-reinforced composite thread having an axial roving is provided and melted in a matrix material. In this case, too, a continuous roving has to be fed, resulting in a corresponding amount of effort and a low deposition speed.

SUMMARY

One of the ideas of the present disclosure is to provide an alternative technique by which the above-mentioned disadvantages can be avoided.

A method according to the disclosure herein is used to produce a fibrous body and comprises constructing the fibrous body in layers by alternately applying a fiber-matrix material to a layer substrate and fusing each applied layer of the fiber-matrix material to each layer substrate. The fiber-matrix material contains a matrix material and a plurality of short fibers and/or fiber particles (e.g. a granular material consisting of or comprising fiber material). In this case, the fibrous body comprises a plurality of crosslinked structures (preferably crosslinked in a fluid-permeable manner) (the layers are therefore applied so as to create such a plurality of crosslinked structures). The fibrous body can, for example, be constructed such that strands of the fiber-matrix material applied in layers are arranged relative to one another in the form of a woven fabric, a laid scrim or a nonwoven fabric.

The term "fiber" refers in this document to the structural and functional construction of the fibrous body that is formed from a plurality of crosslinked structures and can continue to be used as a fiber fabric or a nonwoven fabric according to conventional production of fiber composites or fiber-matrix semi-finished products. Conversely, the term "fiber" relates to a constituent of the printing material (and thus also of the fibrous body), specifically to short fibers and/or fiber particles in the fiber-matrix material.

A fibrous body produced using a method according to the disclosure herein is used as the starting material for a fiber-matrix semi-finished product and/or a composite component, in that the body can be infiltrated with additional matrix material that can be the same as or different to that contained in the fiber-matrix material. In particular, when the structures of the fibrous body are crosslinked so as to be permeable to fluid, the additional matrix material can penetrate into the fibrous body, thereby impregnating it, and cure therein.

Each layer substrate can, for example, be or comprise a previously applied layer; in this case the fusing preferably comprises welding the applied layer to the layer substrate such that the two are joined together. In other situations, the layer substrate can comprise a substrate (for example a plate) or a retaining matter (e.g. a tensioned strand, in particular a fiber, for example of carbon), which can remain on or in the fibrous body following curing or can be removable therefrom.

A fibrous body according to the disclosure herein comprises a plurality of crosslinked structures (preferably crosslinked in a fluid-permeable manner) and is produced from layers of a fiber-matrix material, preferably by a method according to the disclosure herein in one of the embodiments disclosed in this document.

A device according to the disclosure herein is designed or configured to carry out a method according to the disclosure herein as per one of the embodiments disclosed in this document (preferably at least partially automatically), in particular to produce a fibrous body having a plurality of crosslinked structures (preferably crosslinked in a fluid-permeable manner). The device can apply layers of a fiber-matrix material, which contains a matrix material and a plurality of short fibers and/or fiber particles, to a layer substrate, and can fuse each applied layer of the fiber-matrix material to the layer substrate. A device of this kind preferably also comprises a computing unit for automatically controlling and/or regulating the application and fusion structures.

The present disclosure can be used to simply and quickly produce a fibrous body that is suitable for use for producing a fiber-matrix semi-finished product and/or composite component. This prevents waste of the semi-finished textile product, and the quality of the fibrous body produced can be controlled in a particularly effective manner, as early as during production, by controlling the layer pressure and fusion.

The fusing step can preferably comprise solidifying (or leaving to cool) and/or pressing each layer in the local region.

According to an advantageous variant, the fiber-matrix material is applied by a micro-nozzle (or the application structure comprises such a micro-nozzle). Therefore, open-work crosslinked structures of the fibrous body can be produced simply and quickly. This can in particular provide correspondingly effective fluid permeability of the crosslinked structures of the fibrous body.

The short fibers (which preferably have a length of from 0.1 mm to 1 mm) and/or fiber particles are preferably oriented in parallel with one another when applied to each layer substrate, for example by setting a speed at which the fiber-matrix material is discharged from a discharge device such as a micro-nozzle: in combination with forces of adhesion to the discharge device (for example to the inner walls thereof), a speed of this type can bring about a suitable degree of shearing of the short fibers and/or fiber particles, causing the short fibers and/or fiber particles to be oriented in the discharge direction. The discharge speed can be read out from a database and set depending on parameters of the fiber-matrix material (for example the matrix material contained therein, the short fibers or fiber particles contained therein (in particular the material and/or length or size thereof) and/or a process temperature of the fiber-matrix material).

The matrix material contained in the fiber-matrix material can be or comprise a thermoplastic, in particular a thermoplastic polymer. By regulating the temperature, a material of this kind makes it possible to set an advantageous shearing rate for the short fibers and/or fiber particles and to therefore advantageously orient them.

The fiber-matrix material can be applied as a mixture. A mixture of this kind is preferably liquid or viscous when applied. Alternatively or in addition, at least some of the fiber-matrix material can be applied separately as matrix material and short fibers or fiber particles, for example matrix material and short fibers or fiber particles applied one after the other. In particular, the application of the fiber-matrix material can comprise blowing the matrix material and/or the short fibers or fiber particles and/or a mixture of the two onto each layer substrate. This embodiment in particular allows for local differences in the applied fiber-matrix material to be generated in a simple manner. The structure(s) or component(s) for applying the fiber-matrix material of a device according to the disclosure herein can accordingly comprise a fan for the matrix material and/or the short fibers or fiber particles and/or a mixture.

According to an embodiment of a method according to the disclosure herein, the application comprises flooding the entire surface of the layer substrate with the (preferably liquid or viscous) fiber-matrix material, which is locally fused in a targeted manner in each case (i.e. in at least one intended region intended to be part of the fibrous body to be produced). In this case, the fiber-matrix material can be present in the form of a mixture and can preferably be kept moving (e.g. regularly or continuously stirred). As a result, a consistent starting material can be generated for the pressing. The structure(s) or component(s) for applying the fiber-matrix material of a device according to the disclosure herein can accordingly comprise a platform or a container for fiber-matrix material, on which platform or in which container the fibrous body of fiber-matrix material in the process of being produced can be flooded. The structure(s) or component(s) can in this case further comprise an adjustment mechanism for vertically adjusting a position of the platform or of the container during correct use.

According to an advantageous embodiment of a method according to the disclosure herein, the application of fiber-matrix material to the layer substrate comprises bathing the retaining matter in liquid and/or viscous fiber-matrix material. A retaining matter of this type can comprise in particular at least one vertically taut fiber. As a result, the mechanical properties of the fibrous body to be produced can be improved in the vertical direction, in particular the tensile strength thereof. The structure(s) or component(s) for applying the fiber-matrix material of a device according to the disclosure herein can accordingly comprise an attachment device (e.g. a clamping device) for the retaining matter and preferably a receptacle for the fiber-matrix material, which is designed or configured to surround a retaining matter, attached by the attachment device, with the fiber-matrix material at least in regions. An embodiment which comprises an apparatus for modifying a position of the receptacle relative to the retaining matter, for example a lift, is advantageous. Therefore, the retaining matter can be bathed in the fiber-matrix material at various points and thus coated with the fiber-matrix material.

An embodiment of a method according to the disclosure herein which comprises changing the fiber-matrix material when alternately applying and fusing layers is particularly advantageous. For example, alternately applying and fusing layers can comprise applying a first fiber-matrix material (which for example contains a first matrix material and a first short fiber density and/or particle density) and applying a second fiber-matrix material (which for example contains a different matrix material and/or a different short fiber density and/or particle density and/or short fiber length or particle size) that is different from the first.

Therefore, a fibrous body can be produced in a simple manner according to the particular intended use. In particular, a fibrous body (and/or a component made therefrom) produced in this way can comprise regions of different strength and/or conductivity.

According to some embodiments of a method according to the disclosure herein, the fusion of each layer of fiber-matrix material comprises heating using at least one heat source, which preferably locally welds the fiber-matrix material to the transfer base. The application structure(s) or component(s) comprised by the device according to the disclosure herein can preferably accordingly include at least one heat source. An embodiment in which the at least one heat source is moveable and/or the power thereof can be regulated is advantageous. In particular, the structure(s) or component(s) preferably comprise a regulating unit and a temperature measurement device connected thereto, which is designed or configured to record an applied heat and/or a temperature of the at least one heat source.

According to some embodiments, for fusing purposes, two or more heat sources irradiate (at least simultaneously at times) an overlapping region on an applied layer. In this case, the heat sources preferably reach a temperature required for fusing only in combination and in the overlapping region. As a result, fusing can take place in a targeted manner in the overlapping region, whereas the material (substantially) does not fuse in a beam path of each individual heat source due to too low a temperature. Therefore, fusing can also take place below a surface of the fiber-matrix material. The fusion structure(s) or component(s) comprised by a device according to the disclosure herein can accordingly similarly comprise at least two heat sources correspondingly oriented towards an overlapping region.

According to an advantageous embodiment, the fusing comprises using hot gas and/or light in a targeted manner, for example from at least one laser source, infrared source and/or LED. The fusion mechanism(s) or component(s) comprised by a device according to the disclosure herein can accordingly similarly include a hot gas source or a plurality of light sources of this kind.

According to an advantageous embodiment, the fusing step comprises heating by connecting a conductive part of the fibrous body to be produced to a current source. In particular, the layer substrate can comprise an electrically conductive material (for example carbon fibers) and can comprise fusing and connecting at least part of the layer substrate to a current source. By a corresponding passage of current, the layer substrate can be heated and thus an abutting layer of fiber-matrix material can be fused. The fusion mechanism(s) or component(s) comprised by a device according to the disclosure herein can accordingly similarly comprise electrodes that are designed or configured to be connected to a conductive part of the fibrous body to be produced.

Embodiments of this type make it possible to also construct, in a simple manner, very thin-walled fibrous bodies (and corresponding components therefrom) having a very high fiber volume content. Furthermore, the fiber-matrix material layer can be heating in a targeted manner without a heat source having to be suitably focused by a complex device.

A layer which abuts a layer substrate heated in this way by a flow of electrical current can be generated by spraying the fiber-matrix material and/or immersing the heated layer substrate in the fiber-matrix material, thereby achieving particularly rapid fusing.

A fibrous body produced according to a method according to the disclosure herein and having a desired geometric shape can be infiltrated with a thermosetting and/or thermoplastic matrix material (which can be different to or the same as the matrix material contained in the fiber-matrix material). Therefore, a fiber-matrix semi-finished product, in particular a prepreg composite semi-finished product, can advantageously be produced.

A component can be produced from a fiber-matrix semi-finished product advantageously produced in this way. The production can comprise curing the fiber-matrix semi-finished product by hot pressing and/or in an autoclave.

BRIEF DESCRIPTION OF THE DRAWINGS

Some embodiments of the disclosure herein will be described in more detail in the following with reference to the drawings. Of course, the schematic individual elements and components can also be combined in ways other than those shown and/or have different designs, and the method according to the disclosure herein is not restricted to the variants shown.

In the drawings:

FIG. 1 shows an example of a device according to the disclosure herein for producing a fibrous body.

DETAILED DESCRIPTION

FIG. 1 shows an example of a device 100 according to an embodiment of the present disclosure, which is designed (i.e. suitable) to produce a fibrous body 1 using a method according to the disclosure herein in one embodiment; in the FIGURE details of the method are shown in detail in the circle.

The device 100 comprises a portal system 11, by which a micro-nozzle 7 can be moved over a height-adjustable table 9 in order to position layers of a fiber-matrix material 2 thereon in order to produce the fibrous body 1; in this case the fiber-matrix material is conveyed from a container 10 to the micro-nozzle 7. The portal system 11 and the height-adjustable table 9 are preferably automatically controlled by at least one computing unit (not shown). Similarly to the micro-nozzle 7, a heat source 8 is also arranged on an arm of the portal system.

The heat source 8 is designed or configured to heat up each applied layer 4 of the fiber-matrix material and to locally weld each layer 4 to the layer substrate immediately after it has been applied and before any other layer is applied. The orientation of the heat source 8 is preferably controllable such that it can be oriented towards a region to be welded in a targeted manner.

An embodiment which comprises a temperature measurement device (not shown) for recording a temperature of the heat source and/or heat applied, and in which the power of the heat source can be automatically regulated on the basis of a temperature recorded by the temperature measurement device, is advantageous.

The fiber-matrix material 2 contains a matrix material 5 (for example a polymer) and a plurality of short fibers 6 (e.g. carbon fiber pieces and/or glass fiber pieces), which preferably have a length of from 0.1 mm to 1 mm. In the situation shown, a layer 4 is applied to a layer substrate 3, which is a previously applied layer of the fiber-matrix material in this case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A method for producing a fibrous body, comprising:
   constructing the fibrous body in layers by alternately applying a fiber-matrix material to a layer substrate; and
   fusing each applied layer of the fiber-matrix material to the layer substrate,
   wherein the fibrous body comprises a plurality of crosslinked structures and wherein the fiber-matrix material contains a matrix material and a plurality of short fibers and/or fiber particles, and
   wherein applying the fiber-matrix material comprises bathing at least one retaining matter in the fiber-matrix material, wherein the retaining matter comprises at least one vertically taut fiber.

2. The method according to claim 1, wherein the fiber-matrix material is applied by a micro-nozzle.

3. The method according to claim 1, wherein the fiber-matrix material is or comprises a thermoplastic.

4. The method according to claim 3, wherein the thermoplastic is a polymer.

5. The method according to claim 1, wherein applying the fiber-matrix material comprises blowing the matrix material and the short fibers or fiber particles onto each layer substrate or comprises blowing the matrix material or the short fibers or fiber particles onto each layer substrate.

6. The method according to claim 1, wherein applying the fiber-matrix material comprises flooding the entire surface of the layer substrate with the fiber-matrix material, which is locally solidified in a targeted manner.

7. The method according to claim 1, comprising changing the fiber-matrix material when alternately applying and fusing layers.

8. The method according to claim 1, wherein fusing comprises heating using one, two or more heat sources.

9. The method according to claim 1, wherein fusing is carried out by one or more of light and hot gas.

10. The method according to claim 1, wherein the layer substrate comprises an electrically conductive material, and wherein fusing comprises connecting at least part of the layer substrate to a current source.

11. The method according to claim 10, wherein applying the fiber-matrix material comprises one or more of spraying the material onto the layer substrate heated by the flow of current and immersing, in the fiber-matrix material, at least part of the layer substrate heated by the flow of current.

12. A method for producing a component, comprising:
producing a fibrous body, wherein producing the fibrous body comprises constructing the fibrous body in layers by alternately applying a fiber-matrix material to a layer substrate and fusing each applied layer of the fiber-matrix material to the layer substrate, wherein the fibrous body comprises a plurality of crosslinked structures and wherein the fiber-matrix material contains a matrix material and a plurality of short fibers and/or fiber particles; and infiltrating the fibrous body with one or more of a thermosetting matrix and a thermoplastic matrix,
wherein applying the fiber-matrix material comprises bathing at least one retaining matter in the fiber-matrix material, wherein the retaining matter comprises at least one vertically taut fiber.

13. The method according to claim 12, further comprising curing the infiltrated fibrous body by hot pressing and/or in an autoclave.

14. A method for producing a fibrous body, comprising:
constructing the fibrous body in layers by alternately applying a fiber-matrix material to a layer substrate; and
fusing each applied layer of the fiber-matrix material to the layer substrate,
wherein the fibrous body comprises a plurality of crosslinked structures and wherein the fiber-matrix material contains a matrix material and a plurality of short fibers and/or fiber particles, and wherein the layer substrate comprises an electrically conductive material, and
wherein fusing comprises connecting at least part of the layer substrate to a current source.

* * * * *